United States Patent [19]

Inaba et al.

[11] 4,233,183

[45] Nov. 11, 1980

[54] PROCESS FOR PRODUCING PLATE-SHAPED DENITRATING CATALYST

[75] Inventors: Hideya Inaba; Kenichi Nagai; Yasumi Kamino; Kazuo Maeda, all of Osaka, Japan

[73] Assignee: Hitachi Shipbuilding & Engineering Co., Ltd., Osaka, Japan

[21] Appl. No.: 9,962

[22] Filed: Feb. 6, 1979

[51] Int. Cl.³ .............................................. B01J 35/04
[52] U.S. Cl. ................... 252/432; 252/435; 252/437; 252/454; 252/455 R; 252/456; 252/457; 252/458; 252/459; 252/460; 252/461; 252/463; 252/464; 252/465; 252/466 J; 252/469; 252/471; 252/472; 252/475; 252/476; 252/477 R; 423/213.2; 423/213.5; 252/466 PT
[58] Field of Search ................ 252/477 R, 432, 435, 252/437, 454, 455 R, 456, 457, 458, 459, 460, 461, 463, 464, 465, 466 J, 469, 471, 472, 475, 476, 466 PT; 423/213.2, 213.5

[56] References Cited

U.S. PATENT DOCUMENTS

| | | | |
|---|---|---|---|
| 1,934,795 | 11/1933 | Frazer | 423/213.5 |
| 3,362,783 | 1/1968 | Leak | 252/477 R |
| 3,397,154 | 8/1968 | Talsma | 423/213.2 |
| 3,554,929 | 1/1971 | Aarons | 252/477 R |
| 3,849,342 | 11/1974 | Santala | 423/213.2 |
| 3,925,252 | 12/1975 | Yabuta et al. | 252/477 R |
| 4,006,105 | 2/1977 | Fedor et al. | 252/477 R |
| 4,021,372 | 5/1977 | Meguerian et al. | 252/477R |
| 4,040,981 | 8/1977 | Inaba et al. | 252/465 X |

*Primary Examiner*—W. J. Shine
*Attorney, Agent, or Firm*—Armstrong, Nikaido, Marmelstein & Kubovcik

[57] ABSTRACT

A plate-shaped denitrating catalyst is produced by the steps of preparing a slurry from hydrated titania and a sol selected from the group consisting of silica sol, alumina sol and titania sol, firing the slurry to obtain a porous material, pulverizing the porous material to a powder, causing a metal net to support the powder thereon with a binder to form a plate-like piece, drying or firing the piece to obtain a porous carrier and depositing a catalytically active component on the carrier.

9 Claims, 3 Drawing Figures

PROCESS FOR PRODUCING PLATE-SHAPED DENITRATING CATALYST

BACKGROUND OF THE INVENTION

This invention relates to catalysts for use in a reaction in which nitrogen oxides ($NO_x$) in exhaust gases are selectively catalytically reduced with $NH_3$.

Since photochemical smog is attributable to $NO_x$ released from power plants, sintering or firing ovens, various chemical plants, motor vehicles, etc., it has been desired to provide a method of effectively treating such pollutants. Among the processes heretofore proposed for denitrating exhaust gases, the process for catalytically reducing $NO_x$ with $NH_3$ used as a reducing agent is considered advantageous in that the process can be practiced with a relatively small amount of reducing agent because $NH_3$ selectively reacts with $NO_x$ even when the exhaust gas contains more than 1 vol. % of oxygen.

Catalysts already known for use in this process comprise a carrier such as activated alumina, silica-alumina or zeolite and a heavy metal compound deposited on the carrier. Such catalysts are generally granular and are used chiefly in the form of a fixed bed which is liable to be clogged up with the dust contained in exhaust gases or which involves a great pressure loss, thus giving rise to the necessity of using a blower of large capacity. These problems can be overcome to some extent by the use of a catalyst of increased particle or grain size, but the cores of catalyst particles will then fail to act effectively, resulting in a reduced efficiency. In view of the problems described, it appears favourable to use catalysts of honeycomb structure in avoiding the clogging of the catalyst layer with dust or the increase of pressure loss.

Power plants and sintering or firing furnaces usually give off large quantities of exhaust gases which require similarly large quantities of catalysts for treatment. Accordingly catalysts of honeycomb structure, if useful for this purposee, must be large-sized and have sufficient strength so as to be placeable into the treating unit free of any damage. Catalysts of honeycomb structure have already been proposed which comprise a honeycomb support of metal, ceramics or like refractory and an active catalytic component deposited on the support. However, a metal material, if used for the honeycomb structure, must be rendered porous over the surface through a cumbersome procedure so as to hold the active component thereon effectively, whereas structures of ceramics must have an increased wall thickness and be fired to sufficient hardness at a high temperature to retain the desired strength. Catalysts of this type therefore require much labor for the preparation of the honeycomb structure serving as a support for the active catalytic component and become inevitably expensive.

SUMMARY OF THE INVENTION

A first object of this invention is to provide a plate-shaped denitrating catalyst which has a small thickness, high strength and large surface area and which is therefore very suitable to make in a honeycomb structure.

A second object of this invention is to provide a plate-shaped denitrating catalyst having an active component deposited on a carrier with high strength.

A third object of this invention is to provide a plate-shaped denitrating catalyst which can be produced without firing for reinforcing purposes and which therefore retains high porosity and enhanced activity.

A fourth object of this invention is to provide a thin plate-shaped denitrating catalyst which achieves a high efficiency.

To fulfil these objects, this invention provides a process for producing a plate-shaped denitrating catalyst comprising the steps of preparing a slurry from hydrated titania and a sol selected from the group consisting of silica sol, alumina sol and titania sol, firing the slurry to obtain a porous material, pulverizing the porous material to a powder, causing a metal net to support the powder thereon with a binder to form a plate-like piece, drying or firing the piece to obtain a porous carrier and depositing a catalytically active component on the carrier.

DESCRIPTION OF THE PREFERRED EMBODIMENTS

Figure 1:
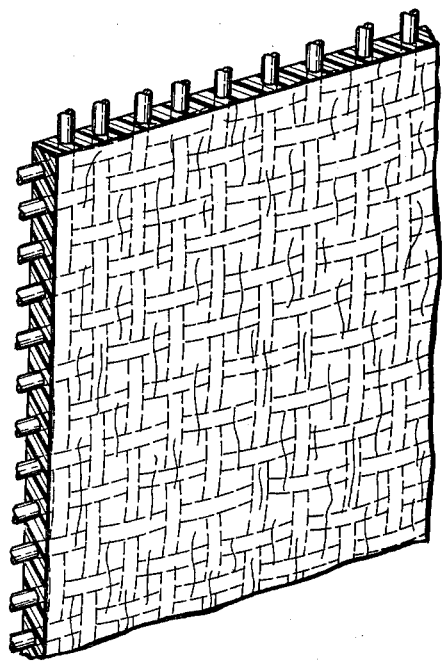
FIG. 1 is a perspective view showing a planar plate-shaped catalyst.

Examples of hydrated titanias useful for the preparation of the slurry of this invention are orthotitanic acid and metatitanic acid. The ratio of the sol to the hydrated titania, which is dependent on the water content of the sol, is 1:10 to 10:1 for example when the sol is silica sol containing 20% of $SiO_2$, alumina sol containing 10% of $Al_2O_3$ or titania sol containing 20% of $TiO_2$.

It is desirable to dry the slurry prior to the slurry firing step. The slurry is dried preferably at 70° to 120° C. for 0.5 to 2 hours. The firing operation subjects the sol to dehydration condensation, causing the sol to embrace the titania and forming a three-dimensional reticular structure which gives improved strength to the catalyst obtained. While the titania serves as a carrier, the dehydration condensation produces of silica sol, alumina sol and titania sol themselves also act to support the active component. Such condensation products have a reticular structure and will not interfere with the action of the titania serving as a carrier.

The pulverizing step is carried out in a usual manner. The particle size of the resulting powder, although not limitative, is preferably minus 100 mesh or smaller.

The plate-like piece having a metal net core is formed usually by preparing a slurry from the powder and a binder and coating the metal net with the slurry. Binders generally used are useful for this purpose. Examples of suitable binders are alumina sol, silica sol, titania sol, phosphoric acid, boric acid and the like which, when dried or fired, undergo dehydration condensation and form a tough three-dimensional reticular structure. The most suitable of thesse examples are alumina sol, silica sol and titania sol which acts as carriers. Preferably the binder has incorporated therein a substance, such as organic solvent, polymeric emulsion or carbon fiber, which vaporizes, decomposes or burns away when dried or fired. Such substance is effective in permitting the slurry of the powder to dry rapidly and giving higher porosity to the plate-like piece to be obtained. The amount of the binder is dependent on the desired strength of the plate-like piece. When silica sol or alumina sol is used as the binder, the sol is used preferably in an amount, calculated as solids, of 10 to 20% of the powder.

The metal nets useful in this invention may be made of any of carbon steel, stainless steel, copper, brass, etc. The wires forming the nets may have such a diameter that the resulting structure shaped to the desired shape will not be deformed during the production of catalysts or during the use of the catalysts obtained. The net is not limited in the size of the openings thereof. Satisfactory results can be achieved with openings of usually about 8- to about 100-mesh size. The net may be in the form of a single planar net, an assembly of superposed planar nets, a wavelike, zigzag, pleated or otherwise shaped net formed by bending or folding a planar net, or a honeycomb structure composed of planar nets and such bent or folded nets in combination therewith. Catalysts of honeycomb structure can be fabricated from the combination of a catalyst formed from a bent or folded metal net and another catalyst formed from a planar metal net. The segments forming such a honeycomb structure may be triangular, square, rectangular, hexagonal or otherwise shaped in accordance with the size of dust particles entrained in exhaust gases and other requirements. Preferably the plate-like piece has a small thickness usually of 0.5 to 2.0 mm.

The plate-like piece is dried or fired under the same conditions as the drying or firing of the starting slurry.

Examplary of useful catalytically active components to be deposited on the carrier are V, Cr, Mn, Fe, Co, Ni, Cu, Zn, Mo, Sn, Sb, Bi, W, Pt, Rh, Pd and like metal compounds. These compounds are used singly or in admixture. Further these compounds may be used conjointly with a P compound, B compound, alkaline earth metal compound or the like. Examples of above-mentioned compounds are oxides, acid oxide salts, nitrates, sulfates, halides, hydroxides, organic acid salts, organic acid esters, alcoholates, etc. The kind and amount of the active component to be deposited on the carrier are determined in accordance with the temperature, composition and the like of the exhaust gas to be treated. The active component is deposited on the carrier in the usual manner as by immersion.

The process of this inventin, which comprises the foregoing steps, gives catalysts in desired sizes and desired shapes including a honeycomb structure. Since particles of titania are firmly held to the metal net by the tough three-dimensional structure resulting from the dehydration condensation of a sol, a catalyst can be produced with satisfactory strength without the necessity of preparing a fired piece with application of pressure for reinforcement. This enables the catalyst to retain increased porosity to exhibit enhanced activity. The thickness of the catalyst is suitably variable by adjusting the amount of the slurry of pulverized porous material to be applied to the metal net, so that an efficient catalyst of reduced thickness can be produced. This renders expensive active component very advantageously usable at a low cost.

Examples of this invention are given below in which parts are by weight.

EXAMPLE 1

Commercial titanyl sulfate (100 parts) was slowly added to 1000 parts of hot water at 80° C. with stirring, and the metatitanic acid formed by the hydrolysis of the titanyl sulfate was withdrawn from the mixture, washed with water and dried at 100° C. A 100 part portion of the dried product was thoroughly kneaded with 100 parts of commercial silica sol (containing 20% of $SiO_2$) to prepare a slurry, which was dried at 100° C. for 1 hour and then fired at 400° C. for 3 hours. The fired product was pulverized to a powder up to 88μ in particle size. Equal amounts of the powder and silica sol the same as one previously used and serving as a binder were mixed together to obtain a powder-containig slurry. The slurry was applied to both sides of a metal net as shown in FIG. 1 and made from wires of steel (SUS 304) 0.25 mm in diameter, the net having 18-mesh openings and measuring 33 mm×50 mm. The coated net was dried at 100° C. for one hour and then baked at 400° C. for 3 hours. In this way, a plate-like carrier was obtained which was about 0.8 mm in thickness and had the metal net as its core. Subsequently the carrier was immersed in a 2 N oxalic acid solution of $NH_4VO_3$ (1.0 mole/liter) at room temperature for 30 minutes, then withdrawn from the solution and thereafter dried at 100° C. for one hour, whereby a plate-shaped catalyst A incorporating V was obtained.

Catalysts B and C were prepared in the same manner as above except that 80 parts and 60 parts of the silica sol were kneaded with the dried product of metatitanic acid per 100 parts of the latter.

EXAMPLE 2

Catalysts D, E and F were prepared in the same manner as in Example 1 except that commercial alumina sol (containing 10% of $Al_2O_3$) was used in place of the silica sol kneaded with the dried product of metatitanic acid, the alumina sol being used in amounts of 200 parts, 160 parts and 120 parts respectively per 100 parts of the dried product.

EXAMPLE 3

Catalysts G, H and I were prepared in the same manner as in Example 1 except that commercial titania sol (containing 20% of $TiO_2$) was used in place of the silica sol kneaded with the dried product of metatitanic acid, the titania sol being used in amounts of 100 parts, 80 parts and 60 parts respectively per 100 parts of the dried product.

COMPARISON EXAMPLE

The dried product of metatitanic acid obtained in Example 1 was fired as such at 400° C. for 3 hours without being kneaded with silica sol. The same procedure as in Example 1 was thereafter followed to prepare a catalyst J. Activity Test A reactor tube of the flow type was prepared which had a rectangular parallelepiped filling portion 50 mm in height and having 5 mm×35 mm openings at its opposite ends. The catalyst A was placed into the filling portion, and a test exhaust gas of the composition listed in Table 1 was passed through the reactor tube at a temperature of 250° C. and at a flow rate of 1 liter/min. (in standard state).

TABLE 1

| Component of gas | Proportion (Vol. %) |
| --- | --- |
| NO | 0.05 |
| $NH_3$ | 0.05 |
| $CO_2$ | 13.0 |
| $H_2O$ | 10.0 |
| $O_2$ | 3.6 |
| $SO_2$ | 0.025 |
| $N_2$ | Balance |

The denitration efficiency of the catalyst was calculated from the difference between the NO concentration at the inlet of the reactor tube and that at the outlet thereof. Similarly the catalyst was tested for denitration efficiency at reaction temperatures of 250° C., 300° C. and 350° C.

In the same manner as above, the catalysts B to J were tested for denitration efficiency at the same temperatures. The results are given in Table 2, which shows that all the catalysts have excellent activity at temperatures of 250° C. and higher. Strength Test A polyvinyl chloride tape was adhered to the periphery of the catalyst A for the protection of the periphery. The catalyst was then secured to the bottom of a cylindrical screen measuring 250 mm in diameter and 50 mm in height and made of a 6-mesh net. One hundred milliliters of alumina balls, 5 mm in diameter, were placed into the screen. The screen was set on an automatic screening device (amplitude 30 mm, frequency 290/min.) and oscillated for one hour. The reduction in weight of the catalyst A was measured to determine the amount of the resulting wear. The same procedure as above was repeated for the catalysts B to J. The results are given in Table 2, which reveals that the catalysts A to I of Examples 1 to 3 are more resistant to wear and have higher strength than the catalyst J of Comparison Example.

TABLE 2

| Catalyst | Amount (parts) of sol per 100 parts of dried product of metatitanic acid | | Denitration efficiency (%) | | | Wear* g/m². hr. |
|---|---|---|---|---|---|---|
| | | | 250° C. | 300° C. | 350° C. | |
| A | Silica sol | 100 | 72.2 | 80.5 | 88.7 | 57.1 |
| B | " | 80 | 74.1 | 84.0 | 92.1 | 69.2 |
| C | " | 60 | 73.3 | 83.5 | 91.8 | 85.6 |
| D | Alumina sol | 200 | 77.6 | 92.5 | 96.0 | 56.7 |
| E | " | 160 | 76.3 | 91.5 | 94.5 | 60.3 |
| F | " | 120 | 74.4 | 89.2 | 93.6 | 65.4 |
| G | Titania sol | 100 | 74.2 | 84.0 | 91.7 | 15.6 |
| H | " | 80 | 73.8 | 83.5 | 91.0 | 20.7 |
| I | " | 60 | 72.8 | 81.2 | 88.5 | 25.1 |
| J (Comp. Ex.) | None | 0 | 73.1 | 83.8 | 90.5 | Entirely broken |

*Weight per unit geometric area per unit time.

EXAMPLE 4

Figure 2:
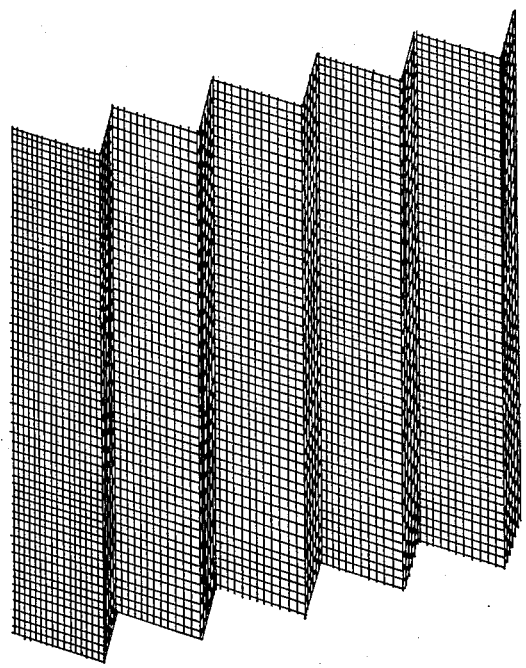
FIG. 2 is a perspective view showing a folded metal net.
Figure 3:
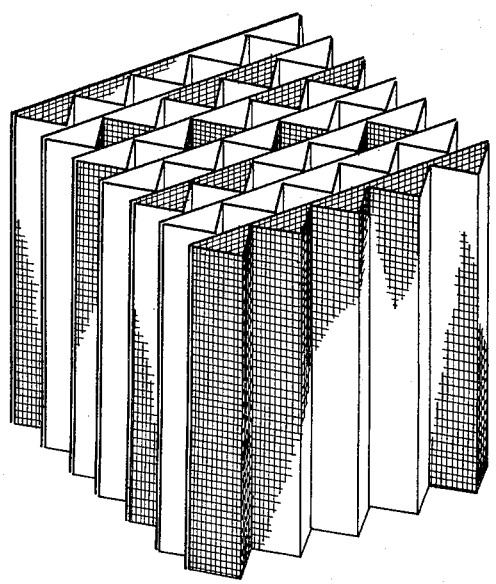
FIG. 3 is a perspective view showing a catalyst of honeycomb structure.

Seven metal nets (measuring 50 mm × 100 mm) of the same kind as used in Example 1 were folded to a zigzag form as shown in FIG. 2. Pieces of catalyst in the form of a folded plate were prepared from the nets in the same manner as in Example 1. Additionally seven planar pieces of catalyst were prepared in the same manner as in Example 1 with the use of planar metal nets (measuring 50 mm × 50 mm) of the same kind as used in Example 1. The folded pieces of catalyst and planar pieces of catalyst thus formed were alternately superposed to fabricate a catalyst of cubic honeycomb structure measuring 50 mm in each side and shown in FIG. 3. Activity Test In the same manner as above, the honeycomb catalyst was tested for denitration efficiency with use of a reactor tube of the flow type having a portion for accommodating the catalyst. The test exhaust gas was passed through the tube at a rate of 15.5 m³/m² per unit geometric area of the catalyst (in standard state). The results are listed in Table 3.

TABLE 3

| Reaction temperature (° C.) | Denitration efficiency (%) |
|---|---|
| 250 | 78.0 |
| 300 | 89.5 |
| 350 | 97.3 |

Table 3 indicates that the honeycomb catalyst has excellent denitrating activity.

What is clamed is:

1. A process for producing a catalyst for reducing nitrogen oxides in exhaust gases and comprising the steps of preparing a slurry from hydrated titania and a sol selected from the group consisting of silica sol, alumina sol and titania sol, firing the slurry to obtain a porous material, pulverizing the porous material to a powder, supporting the powder on a metal net with an inorganic dehydration-condensed binder and filling the openings of the net to form a plate-like piece having the metal net as its core, drying or firing the piece to obtain a porous carrier and depositing a catalytically active component on the porous carrier.

2. A process as defined in claim 1 wherein the inorganic dehydration-condensed binder is a material selected from the group consisting of alumina sol, silica sol, titania sol, phosphoric acid and boric acid.

3. A process as defined in claim 1 wherein the inorganic dehydration-condensed binder has incorporated therein an organic solvent, polymeric emulsion or carbon fiber.

4. A process as defined in claim 1 wherein the metal net has been bent or folded to a wavelike or zigzag form.

5. A process as defined in claim 1 wherein the metal net has a honeycomb structure.

6. A process as defined in claim 1 wherein the plate-like piece is formed by coating the metal net with a slurry of the powder and the binder.

7. A process as defined in claim 1 wherein the active component is a metal selected from the group consisting of V, Cr, Mn, Fe, Co, Ni, Cu, Zn, Mo, Sn, Sb, Bi, W, Pt, Rh and Pd.

8. A process as defined in claim 1 wherein the catalyst has a thickness of 0.5 to 2.0 mm.

9. A catalyst produced by the process defined in any one of claims 1 to 7 and 8.

* * * * *